under 35 U.S.C. 154(b) by 420 days.

(12) United States Patent
Holt et al.

(10) Patent No.: US 7,596,835 B2
(45) Date of Patent: Oct. 6, 2009

(54) HOSE CLAMP FOR A HOSE AND ASSEMBLY

(75) Inventors: Ben F. Holt, Lexington, TN (US); Christopher W. Smith, Lexington, TN (US); Joel L. Hatchett, Henderson County, TN (US)

(73) Assignee: Fluiding Routing Solutions, Inc., Southfield, MI (US)

( * ) Notice: Subject to any disclaimer, the term of this patent is extended or adjusted under 35 U.S.C. 154(b) by 420 days.

(21) Appl. No.: 11/202,084

(22) Filed: Aug. 12, 2005

(65) Prior Publication Data
US 2007/0035123 A1  Feb. 15, 2007

(51) Int. Cl.
*F16L 33/08* (2006.01)
*F16L 33/00* (2006.01)

(52) U.S. Cl. .................... 24/16 R; 24/274 R
(58) Field of Classification Search .......... 24/16 R, 24/274 R, 279, 280
See application file for complete search history.

(56) References Cited

U.S. PATENT DOCUMENTS

| 2,571,659 | A | * | 10/1951 | Bergstrom | 24/274 R |
| 3,087,220 | A | * | 4/1963 | Tinsley | 24/274 R |
| 3,604,074 | A | * | 9/1971 | Bambas | 24/274 R |
| 3,916,488 | A | * | 11/1975 | Gazda et al. | 24/16 R |
| 4,473,928 | A | * | 10/1984 | Johnson | 24/483 |
| 4,946,895 | A | * | 8/1990 | Ohmae et al. | 525/75 |
| 5,002,094 | A |  | 3/1991 | Brovont |  |
| 5,145,218 | A |  | 9/1992 | Worley et al. |  |
| 5,185,913 | A |  | 2/1993 | Campo et al. |  |
| 5,234,233 | A |  | 8/1993 | Fix |  |
| 5,388,321 | A |  | 2/1995 | Farrell |  |
| 5,397,831 | A | * | 3/1995 | Saito et al. | 524/502 |
| 5,566,988 | A | * | 10/1996 | Johnston et al. | 285/93 |
| 6,390,136 | B1 |  | 5/2002 | Hutchins et al. |  |
| 6,530,609 | B1 | * | 3/2003 | Chatterton | 285/420 |
| 6,773,037 | B2 |  | 8/2004 | Spurgat |  |

FOREIGN PATENT DOCUMENTS

WO   02/42675   5/2002

* cited by examiner

*Primary Examiner*—Robert J Sandy
(74) *Attorney, Agent, or Firm*—Marshall & Melhorn LLC

(57) ABSTRACT

A hose clamp includes a band including an outer layer comprising a first material and an inner layer comprising a second material different than the first material. A connector secures the band to itself. The second material is selected to enhance bonding between the band and a hose comprising a material different than the first material.

19 Claims, 4 Drawing Sheets

HOSE CLAMP FOR A HOSE AND ASSEMBLY

TECHNICAL FIELD

The present application relates generally to hose connections and more particularly to a hose clamp that includes a multi-layer band.

BACKGROUND

It is often advantageous to provide partially assembled parts, for example, to an automobile manufacturer for downstream assembly in an automobile. Hose sometimes includes a hose clamp that is pre-attached at a precise location for further assembly in a vehicle. Materials used to form the hose clamp are selected for certain desirable properties such as corrosion resistance. However, these materials may resist bonding to the hose. To this end, clamp and hose assemblies have been proposed that utilize a separate component, such as a clip, that is bonded to the hose and then the hose clamp is attached to the separate component.

SUMMARY

In an aspect, a hose clamp includes a band including an outer layer comprising a first material and an inner layer comprising a second material different than the first material. A connector connected to the band is configured to secure the band to itself. The second material is selected to enhance bonding between the band and a hose comprising a material different than the first material.

In another aspect, a hose clamp includes a band comprising a first material and a connector configured to secure the band to itself. A coating including a second material different than the first material is permanently bonded to a surface of the band during a coating process to form an inner bonding layer carried by the band and selected to enhance bonding between the band and a hose comprising a material different than the first material.

In another aspect, a clamp and hose assembly includes a flexible hose including a first material and a hose clamp bonded to the hose. The hose clamp includes a band including an outer layer comprising a second material different than the first material and an inner layer comprising a third material different than the second material. A connector is configured to secure the band to itself. The inner layer is bonded to the hose and the third material is selected to enhance bonding between the band and the hose.

In another aspect, a method of bonding a hose clamp comprising a band of a first material to a hose comprising a second material different than the first material at a selected axial location along the hose is provided. The method includes permanently bonding a coating material different than the first material to the first material to form an inner bonding layer carried by the band and selected to enhance bonding between the band and the hose. Then, the band is bonded to the hose at a selected axial location along a length of the hose, the inner bonding layer is located between the first material and the second material.

The details of one or more embodiments of the invention are set forth in the accompanying drawings and the description below. Other features, objects, and advantages of the invention will be apparent from the description and the drawings, and from the claims.

DETAILED DESCRIPTION

Figure 1:
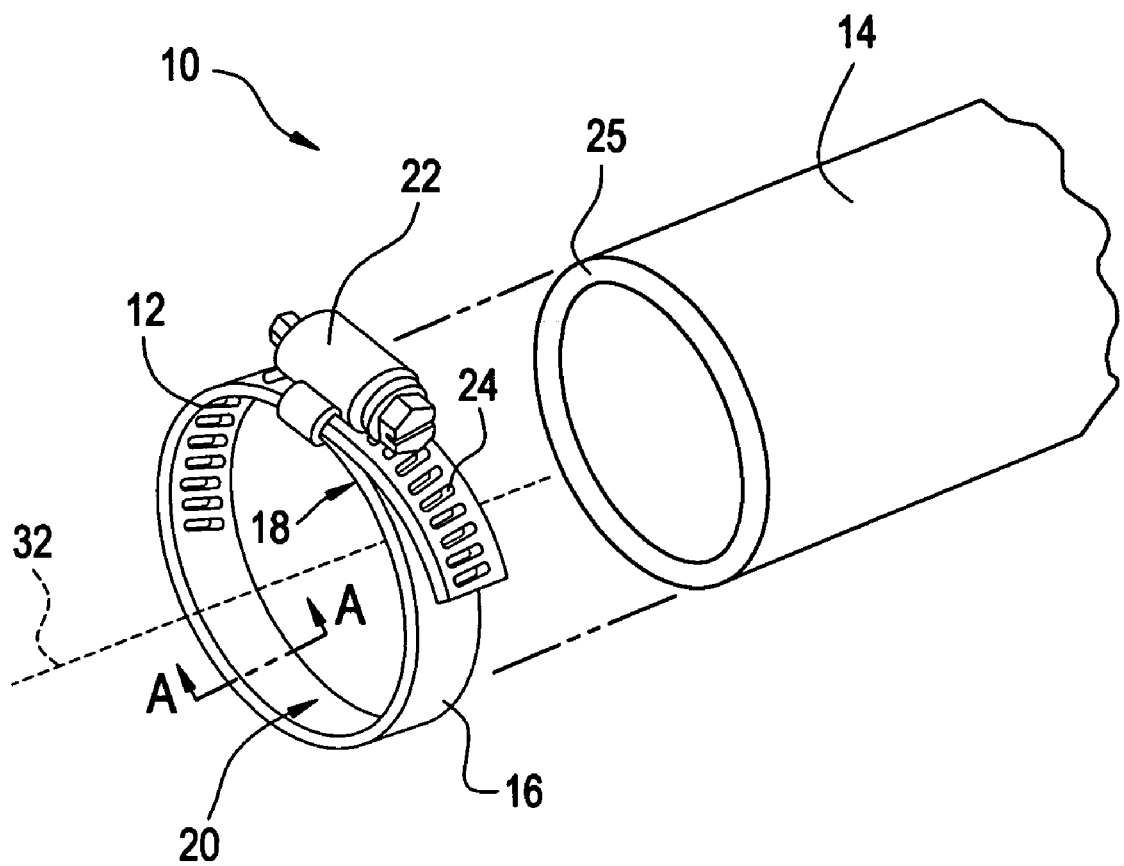
FIG. 1 is a perspective view of an embodiment of a clamp and hose assembly.

Referring to FIG. 1, a hose and clamp assembly 10 includes a hose clamp 12 and a flexible hose 14. Hose clamp 12 includes a band 16 that is overlapped on itself to form an adjustable ring having an overlapped region 18 and an opening 20. The size of opening 20 is adjustable, for example, to receive an end 25 of the hose 14 and to apply a clamping force to the hose. A connector 22 is located at the overlapped region 18 and is capable of securing the band 16 to itself with the opening 20 at a desired size. In some embodiments, the connector 22 is used to adjust the size of opening 20 using slots 24 extending through band 16. As shown, connector 22 is a worm gear-type clamp. A suitable connector is described in U.S. Pat. No. 4,763,695, the details of which are hereby incorporated by reference as if fully set forth herein. While a worm gear-type clamp is depicted, any suitable connector can be utilized, such as a crimp clamp, a constant tension clamp such as a spring-loaded clamp, a T-bolt clamp, etc. In some embodiments, band 16 is not overlapped to form overlap region 18.

Figure 1A:
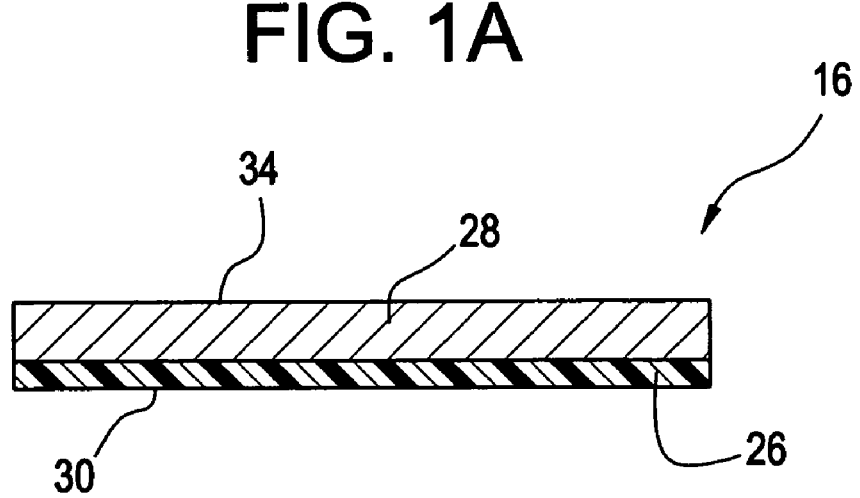
FIG. 1A is a cross-section view of the clamp along line A-A of FIG. 1.

Referring to FIG. 1A, band 16 is a multi-layer construction. Band 16 includes an inner layer 26 permanently bonded to an outer layer 28. Inner layer 26 includes a surface 30 that, with the band 16 in the shape of a ring, faces toward a central axis 32 of the ring (FIG. 1). Outer layer 28 includes a surface 34 that, with the band in the shape of a ring, faces away from the central axis 32 (FIG. 1).

Material forming the inner layer 26 of the band 16 is different than material forming the outer layer 28 of the band 16. For example, in some embodiments, material forming the outer layer 28 is metal and material forming inner layer 26 is plastic. Any suitable materials can be selected to form the inner and outer layers 26 and 28. Suitable materials for forming inner layer include nylon (e.g., nylon 6, nylon 6/6, nylon 6/6/6 copolymer or blend and nylon 4/6), ethylene vinyl acetate, poly vinyl acetate, polyester (e.g., polyethylene terephthalate and polyethylene naphthalene), acetal, polyetherimide, polysulfone, polyphenylene sulfide, polyether sulfone, polyetheretherketone, polythalamide, and the like. Fillers may also be used to enhance certain properties of the inner layer, such as glass fiber or bead (e.g., 0 to 50 weight percent), carbon fiber (e.g., 0 to 40 weight percent), aramid fiber (e.g., 0 to 25 weight percent), mineral filler (e.g., 0 to 60 weight percent), molybdenum disulfide (e.g., 0 to 5 weight percent), and the like.

It may be desirable to bond the hose clamp 12 and the hose 14 together at an axial location along the length of the hose 14.

In these instances, inner layer 26 can be formed of a material, such as one or more of those materials described above, capable of enhancing a bond strength (i.e., the amount of stress required to separate the band from the hose when bonded thereto) between the band 16 and the hose 14 as compared to the band 16 formed of only material forming outer layer 28. For example, in an embodiment, outer layer 28 is formed of a steel such as stainless steel and inner layer 26 is formed of a thermoplastic. The thermoplastic is selected to provide a stronger bond between the band 16 and the hose 14 compared to the bond that could be provided between the steel and the hose. As will be described in greater detail below, an adhesive may be used to bond the band 16 to the hose 14. In these embodiments, material forming inner layer 26 bonds more readily to the adhesive compared to the material forming the outer layer 28 to enhance the bond strength between the band 16 and the hose 14.

Figure 2:
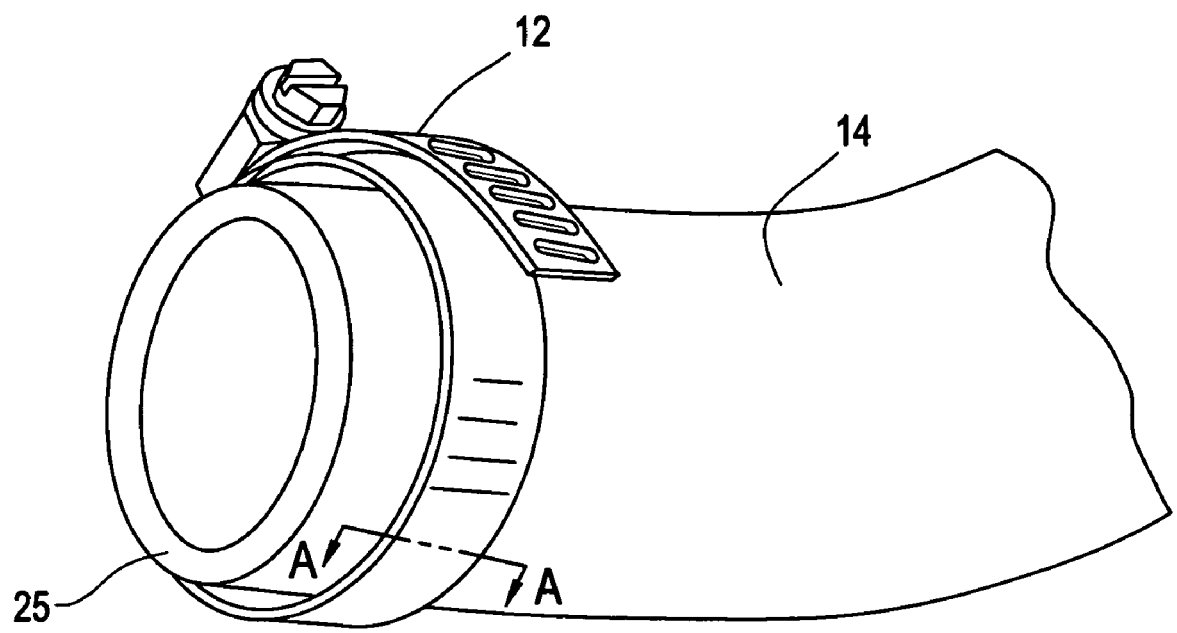
FIG. 2 is a perspective view of the clamp and hose assembly of FIG. 1 with the clamp bonded to the hose.

FIG. 2 shows hose clamp 12 adhesively bonded to hose 14 at an axial location along a length of the hose with end 25 of the hose 14 received through opening 20 of the hose clamp. Hose clamp 12 is bonded to the hose 14 to inhibit axial movement of the hose clamp along the length of the hose and also to inhibit rotation of the hose clamp about a periphery of the hose. This can allow the hose clamp 12 to be held in a predetermined position relative to the hose 14, for example, with little or no crimping force being applied by the house clamp and for subsequently operating the hose clamp to secure the hose 14 at a pre-selected location to another component, such as a nozzle.

Figure 2A:
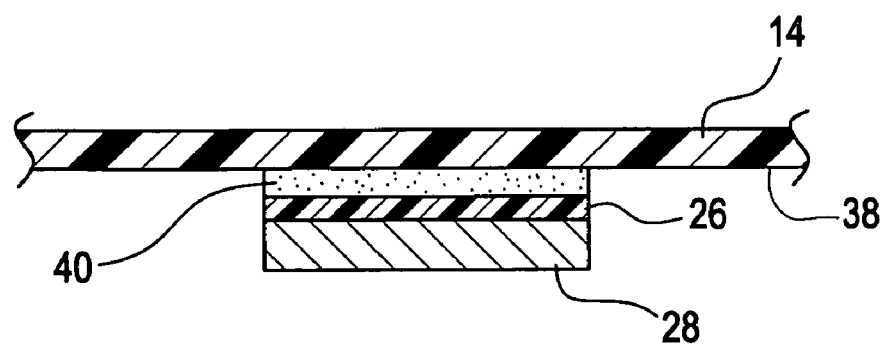
FIG. 2A is a cross-section view of the clamp and hose assembly along line A-A of FIG. 2.

Referring to FIG. 2A, the hose clamp 12 is bonded to an outer surface 38 of hose 14 using an adhesive 40. As noted above, inner layer 26 of band 16 readily bonds to the adhesive 40 due to the material selected to form the inner layer. The adhesive 40 is also selected to bond to material forming the outer surface 38 of the hose 14.

Any suitable materials can be used to form hose 14, such as polymers including elastomers. The hose 14 can be formed for use in a vehicle, such as for use as conduit in a coolant system of an internal combustion engine (not shown). If desired, the flexible hose 14 can be cured so as to have a pre-bent shape.

Figure 3:
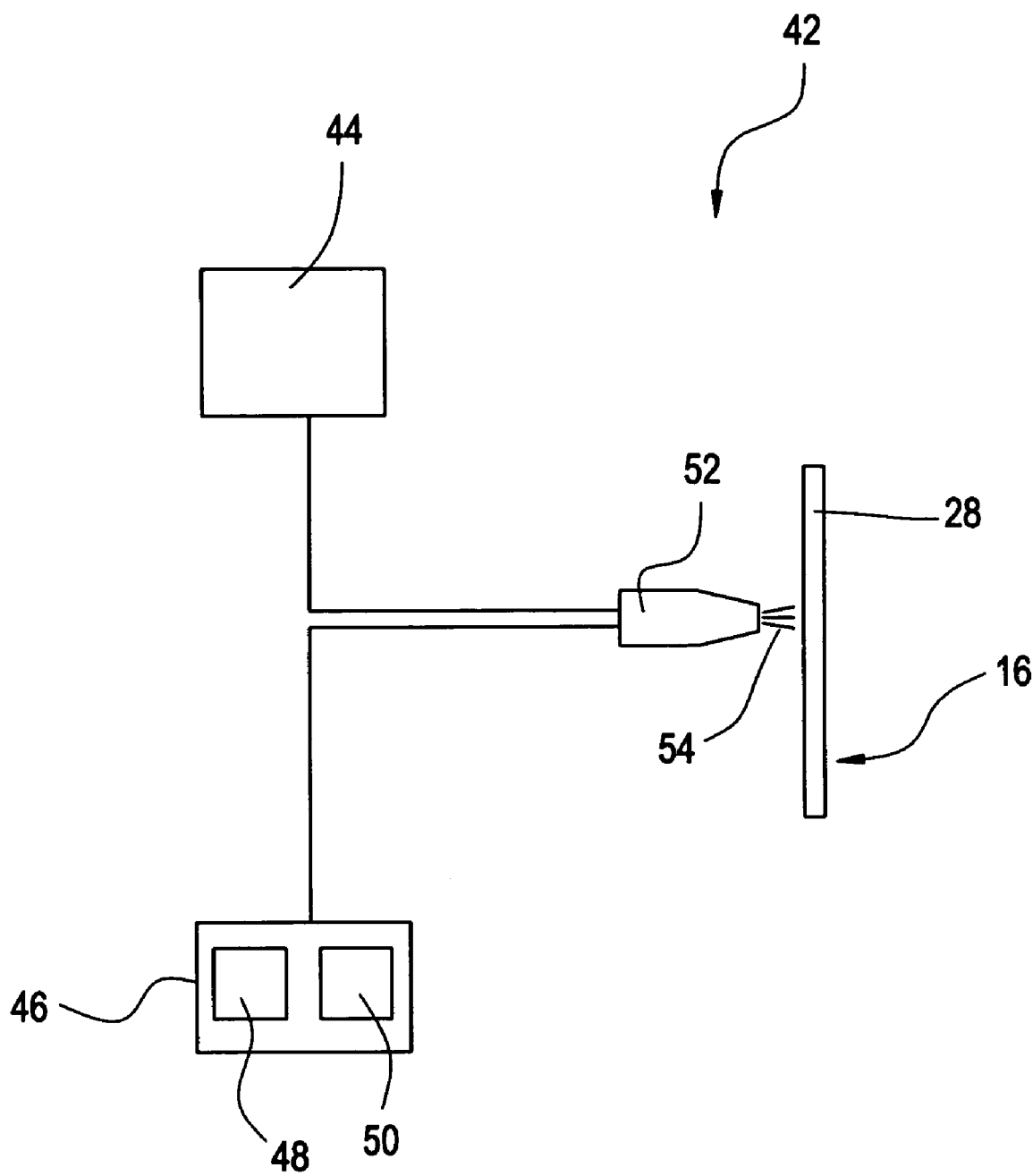
FIG. 3 illustrates an embodiment of a method of forming the clamp of FIG. 1.

Inner layer 26 of the band 16 can be formed using a suitable powder coating process. Referring to FIG. 3, an exemplary powder coating process 42 includes a control unit 44, a powder unit 46 including powder hopper 48 and pump 50, and a sprayer 52 for spraying powder 54 onto outer layer 28 of band 16. The outer layer 28 of band 16 can be grounded and a static charge can provide an adhesive force for adhering dry powder 54 delivered by the sprayer 52 to the outer layer. Heat can be applied to the powder 54 to cause the powder to melt and fuse together to form a continuous inner layer 26 permanently bonded directly to the outer layer 28 (e.g., without use of adhesive or other intermediate bonding agent). In an alternative embodiment, a fluid based powder coating process can be utilized to form the inner layer 26. Other suitable coating processes can be used and connector 22 can be connected to the band 16 before or after the coating process. In some embodiments, the coating of the inner layer is bonded to a sheet and the band or bands 16 are formed from the sheet (e.g., by stamping or cutting) after the coating is bonded thereto.

Figure 4:
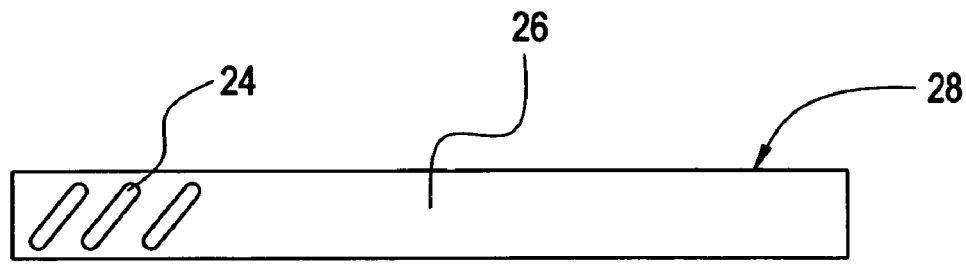
FIGS. 4-6 illustrate various clamp band embodiments having an inner layer and an outer layer.
Figure 5:
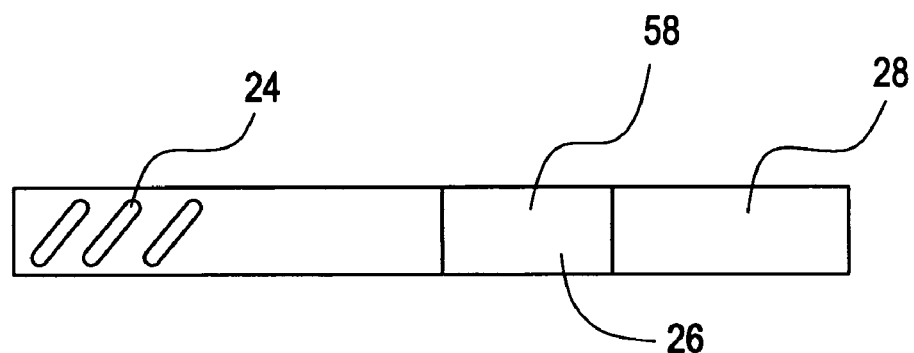
Figure 6:
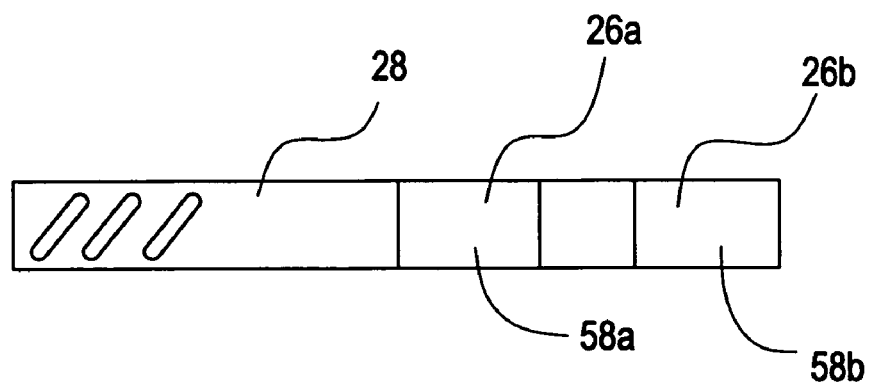

Referring now to FIGS. 4-6, any suitable coating pattern can be used. Referring to FIG. 4, the entire inner surface of outer layer 28 is bonded to inner layer 26 including regions around slots 24. Referring to FIG. 5, only a single portion 58 of outer layer 28 is coated with inner layer 26. FIG. 6 shows outer layer 28 having multiple portions 58a and 58b coated with inner layer segments 26a and 26b.

Hose clamp 12 provides a single, unitary structure that can be readily attached to the hose 14 without any need for an intermediate bonding member, such as a clip or a sleeve. The band 16 can be formed of an outer layer of a corrosion resistant material, such as stainless steel, and an inner layer of a material having a relatively high bond strength compared to the corrosion resistant material. The inner layer 26 is permanently bonded directly to the outer layer 28 to form the band structure. The material forming inner layer 26 can be selected to be particularly well suited for bonding to an adhesive.

A number of detailed embodiments have been described. Nevertheless, it will be understood that various modifications may be made. For example, hose clamp and hose assembly 10 may include more than one clamp 12 and/or more than one hose 14. Accordingly, other embodiments are within the scope of the following claims.

What is claimed is:

1. A hose clamp comprising:
   a band including an outer layer comprising a first material and an inner layer comprising a coating of a second material different than the first material; and
   a connector configured to secure the band to itself;
   wherein the second material is selected to enhance bonding between the band and a hose comprising a material different than the first material, and wherein the inner layer is bonded directly to the first material and forms an exposed inner surface of the band.

2. The hose clamp of claim 1, wherein the band overlaps itself to form an adjustable ring having an overlap region, the connector being disposed at the overlap region to secure the overlapped band to itself.

3. The hose clamp of claim 1, wherein the second material is powder coated directly to the first material.

4. The hose clamp of claim 1, wherein the first material comprises metal and the second material comprises plastic.

5. The hose clamp of claim 4, wherein the second material is selected from a group consisting of nylon, ethylene vinyl acetate, poly vinyl acetate, polyester, acetal, polyetherimide, polysulfone, polyphenylene sulfide, polyether sulfone, polyetheretherketone and polythalamide.

6. The hose clamp of claim 5, wherein the first material comprises stainless steel.

7. The hose clamp of claim 5, wherein the second material includes a filler.

8. The hose clamp of claim 7, wherein the filler is selected from a group consisting of glass fiber, glass bead, carbon fiber, aramid fiber, mineral filler and molybdenum disulfide.

9. A hose clamp comprising:
   a band comprising a first material;
   a connector configured to secure the band to itself; and
   a coating comprising a second material different than the first material permanently bonded to a surface of the band during a coating process to form an inner bonding layer carried by the band and selected to enhance bonding between the band and a hose comprising a third material different than the first material, wherein the inner layer forms an exposed inner surface of the band.

10. The hose clamp of claim 9, wherein the band overlaps itself to form an adjustable ring having an overlap region, the connector being disposed at the overlap region to secure the overlapped band to itself.

11. The hose clamp of claim 9, wherein the coating is a powder coating.

12. The hose clamp of claim 9, wherein the second material is bonded directly to the first material.

13. The hose clamp of claim 9, wherein the first material comprises metal and the second material comprises plastic.

14. The hose clamp of claim 13, wherein the second material is selected from a group consisting of nylon, ethylene vinyl acetate, poly vinyl acetate, polyester, acetal, polyetherimide, polysulfone, polyphenylene sulfide, polyether sulfone, polyetheretherketone and polythalamide.

15. The hose clamp of claim 14, wherein the first material comprises stainless steel.

16. The hose clamp of claim 14, wherein the second material includes a filler.

17. The hose clamp of claim 16, wherein the filler is selected from a group consisting of glass fiber, glass bead, carbon fiber, aramid fiber, mineral filler and molybdenum disulfide.

18. A hose clamp comprising:
 a band including an outer layer comprising a first material and an inner layer comprising a coating of a second material different than the first material; and
 a connector configured to secure the band to itself;
 wherein the second material is bonded directly to the first material and is selected to enhance bonding between the band and a hose comprising a material different than the first material, and wherein the inner layer forms an exposed inner surface of the band;
 wherein the second material is selected from a group consisting of nylon, ethylene vinyl acetate, poly vinyl acetate, polyester, acetal, polyetherimide, polysulfone, polyphenylene sulfide, polyether sulfone, polyetheretherketone and polythalamide.

19. The hose clamp of claim 18, wherein the second material includes a filler.

* * * * *